United States Patent
Goindani et al.

(10) Patent No.: US 12,156,092 B2
(45) Date of Patent: Nov. 26, 2024

(54) WIRELESS COMMUNICATIONS SYSTEMS WITH SOCIAL DISTANCING IDENTIFICATION

(71) Applicant: Apple Inc., Cupertino, CA (US)

(72) Inventors: Mahak Goindani, Cupertino, CA (US); Gencer Cili, San Jose, CA (US)

(73) Assignee: Apple Inc., Cupertino, CA (US)

( * ) Notice: Subject to any disclaimer, the term of this patent is extended or adjusted under 35 U.S.C. 154(b) by 179 days.

(21) Appl. No.: 17/592,343

(22) Filed: Feb. 3, 2022

(65) Prior Publication Data
US 2023/0247385 A1    Aug. 3, 2023

(51) Int. Cl.
*H04W 4/02* (2018.01)
*H04W 4/38* (2018.01)

(52) U.S. Cl.
CPC ............ *H04W 4/023* (2013.01); *H04W 4/38* (2018.02)

(58) Field of Classification Search
CPC ..... H04W 4/029; H04W 4/02; H04W 64/003; H04W 8/005; H04W 12/02; H04W 16/18; H04W 24/00; H04W 24/06; H04W 4/023; H04W 4/38
See application file for complete search history.

(56) References Cited

U.S. PATENT DOCUMENTS

| | | | | |
|---|---|---|---|---|
| 11,617,060 | B2 * | 3/2023 | Tsai | H04W 4/029 455/456.1 |
| 11,703,818 | B2 * | 7/2023 | Peters | G06V 40/20 700/276 |
| 2015/0172856 | A1 * | 6/2015 | Vanderwater | H04W 4/029 455/457 |
| 2021/0166819 | A1 | 6/2021 | Gupta et al. | |
| 2021/0311682 | A1 | 10/2021 | Chowdhury et al. | |
| 2021/0313075 | A1 | 10/2021 | Mc Namara et al. | |
| 2022/0028246 | A1 * | 1/2022 | Chang | H04W 4/029 |
| 2022/0225115 | A1 * | 7/2022 | Kalavakuru | H04B 17/391 |
| 2023/0021462 | A1 * | 1/2023 | Valenza | H04B 17/391 |

(Continued)

FOREIGN PATENT DOCUMENTS

| | | | | |
|---|---|---|---|---|
| CN | 207799837 | U | * | 8/2018 |
| CN | 108200566 | B | | 3/2021 |
| EP | 4040811 | A1 | * | 8/2022 ............ H04W 4/021 |

(Continued)

*Primary Examiner* — Dung Hong
(74) *Attorney, Agent, or Firm* — Treyz Law Group, P.C.; Michael H. Lyons

(57) ABSTRACT

A wireless network may include network equipment such as base stations that operate within cells and that communicate with user equipment (UE) devices. The network equipment may harvest anonymized data from the UE devices and may generate connection counts based on the anonymized data. The network equipment may estimate the total population of each cell based on the connection counts, may generate a maximum number of individuals allowed in the cells under a social distancing guideline, and may compare the estimated total population of the cells to the maximum number of individuals. Cells having an estimated total population that exceeds the maximum number of individuals may be labeled as cells having poor social distancing. Information may be provided to a UE device identifying these cells to allow a user to make informed decisions on where to travel without exposing private information to the network.

20 Claims, 9 Drawing Sheets

(56) References Cited

U.S. PATENT DOCUMENTS

2023/0262088 A1\* 8/2023 Kerr ................... H04W 12/47
726/22

FOREIGN PATENT DOCUMENTS

| KR | 102181197 B1 \* | 11/2020 | | |
|---|---|---|---|---|
| WO | WO-2016107644 A1 \* | 7/2016 | ............ | H04W 4/022 |
| WO | WO-2022169571 A1 \* | 8/2022 | ............ | H04W 4/021 |

\* cited by examiner

WIRELESS COMMUNICATIONS SYSTEMS WITH SOCIAL DISTANCING IDENTIFICATION

FIELD

This disclosure relates generally to wireless communications and, more particularly, to wireless communications between electronic devices and wireless base stations.

BACKGROUND

Electronic devices are often provided with wireless capabilities for communicating with wireless base stations. The wireless base stations serve as a communications interface between the electronic devices and other portions of a wireless network. Users of electronic devices with wireless capabilities often use the electronic devices for navigational purposes or to obtain information about different geographic locations.

SUMMARY

A wireless network may include network equipment. The network equipment may include wireless base stations. The wireless base stations may operate within respective cells. The wireless base stations may communicate with user equipment (UE) devices. The network equipment may periodically harvest anonymized UE data from the UE devices to protect the personal information of users of the UE devices. The anonymized UE data may include time stamps and globally unique cell identifiers, for example. The network equipment may generate a connection count for each of the wireless base stations based on the time stamps and globally unique cell identifiers. The network equipment may also harvest radio-frequency sensor data from the UE devices. The radio-frequency sensor data may be indicative of other UE devices that are not connected to the wireless base stations. The network equipment may also receive an application programming interface from a network carrier associated with UE devices that use other operating systems.

The network equipment may estimate the total population of each cell based on the connection counts, the radio-frequency sensor data, the application programing interface, and/or time/date information. The network equipment may identify an area required by an individual person for each cell based on a social distancing guideline/protocol associated with the cells. The network equipment may generate a maximum number of individuals allowed in the cells under the social distancing guideline based on the area of the cells and the area required by an individual person. The network equipment may compare the estimated total population of each cell to the maximum number of individuals allowed in the cells. Cells having an estimated total population that exceeds the maximum number of individuals may be labeled as non-social distancing-friendly cells. Cells having an estimated total population less than the maximum number of individuals may be labeled as social distancing-friendly cells. The network equipment may provide information to one or more of the UE devices identifying the non-social distancing-friendly cells and/or the social distancing-friendly cells. The UE devices may display this information (e.g., using a map application). This may allow the users of the UE devices to make informed decisions on where to travel while remaining safe during a global pandemic, without exposing private information associated with the UE devices to the network.

An aspect of the disclosure provides a method of operating a wireless network having a set of base stations. The method can include identifying a connection count indicative of a number of user equipment (UE) devices connected to a base station from the set of base stations. The method can include estimating a population density of a cell of the base station based at least on the connection count. The method can include providing information indicative of the estimated population density to a UE device for display by the UE device.

An aspect of the disclosure provides a method of operating an electronic device having a display. The method can include receiving, from a wireless base station in a wireless network, information identifying a geographic area having an estimated population density that exceeds a maximum threshold population density as determined, by the wireless network, based on a social distancing protocol governing the geographic area and a user equipment (UE) connection count of a cell overlapping the geographic area. The method can include with an application running on the electronic device, using the display to display a map that includes a graphical element identifying the geographic area as having excessive population density.

An aspect of the disclosure provides a method of operating one or more processors in a wireless network that includes at least a first wireless base station in a first cell, a second wireless base station in a second cell, and a user equipment (UE) device in the first cell. The method can include harvesting time stamps and globally unique cell identifiers from UE devices in the second cell. The method can include generating a first connection count for the second wireless base station based on the time stamps and globally unique cell identifiers harvested from the UE devices in the second cell. The method can include estimating a total number of people in the second cell based at least on the first connection count. The method can include comparing the estimated total number of people in the second cell to a maximum number of people allowed in the second cell by a first social distancing protocol associated with the second cell. The method can include using the first wireless base station to inform the UE device in the first cell when the estimated total number of people in the second cell exceeds the maximum number of people allowed in the second cell by the first social distancing protocol.

DETAILED DESCRIPTION

Figure 1:
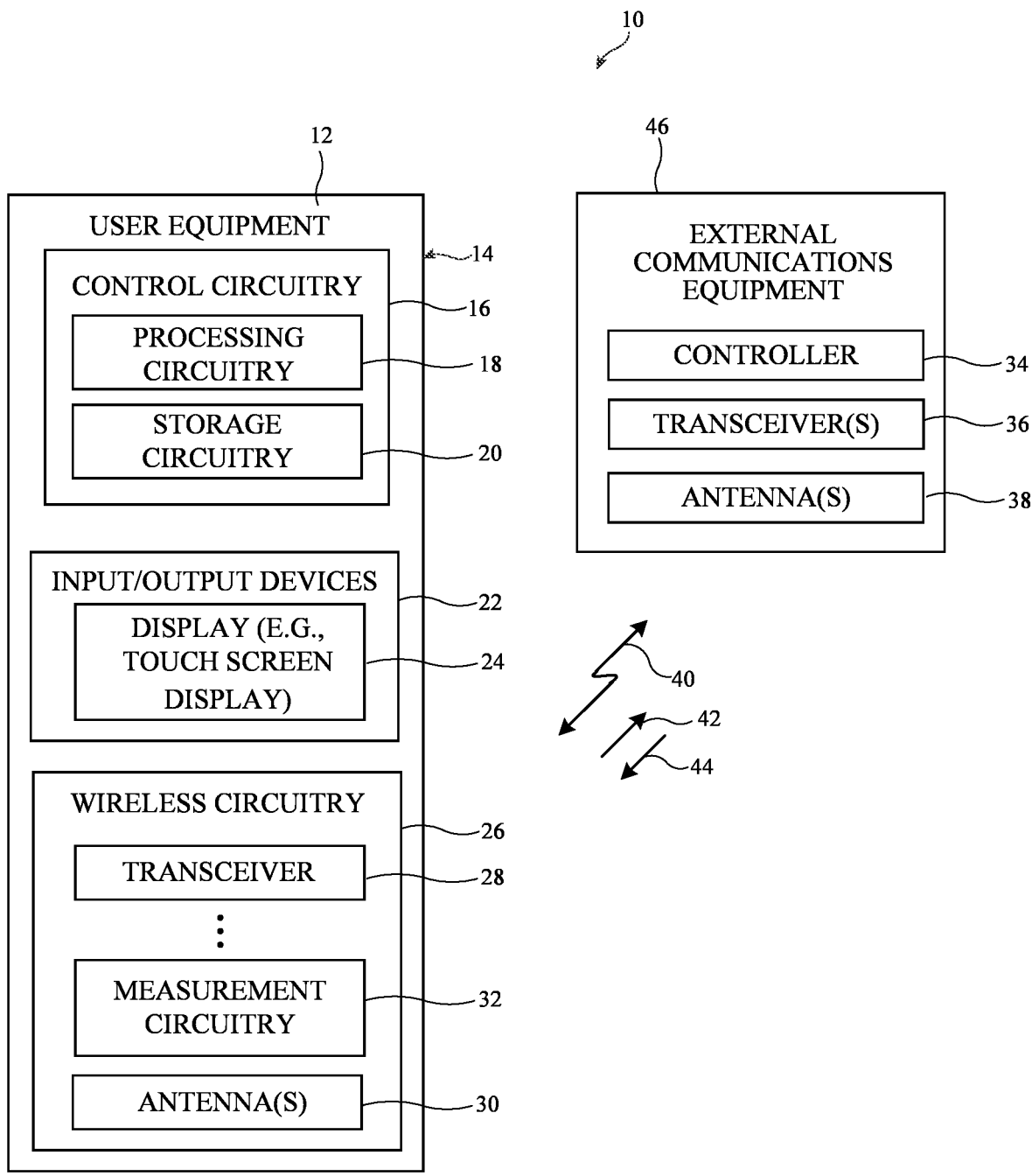
FIG. 1 is a functional block diagram of an illustrative communications system including user equipment that performs wireless communications with external communications equipment in accordance with some embodiments.

FIG. 1 is a functional block diagram of an illustrative communications system 10 (sometimes referred to herein as communications network 10) for conveying wireless data between communications terminals. As shown in FIG. 1, communications system 10 may include network nodes (e.g., communications terminals) such as user equipment (UE) 12 and external communications equipment 46. User equipment 12 and external communications equipment 46 may communicate with each other using a wireless communications link. If desired, user equipment 12 may wirelessly communicate with external communications equipment 46 without passing communications through any other intervening network nodes in communications system 10 (e.g., user equipment 12 may communicate directly with external communications equipment 46 over-the-air).

Communications system 10 may form a part of a larger communications network that includes network nodes coupled to external communications equipment 46 via wired and/or wireless links. The larger communications network may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, wireless base stations (e.g., gNB's), switches, routers, servers, modems, repeaters, telephone lines, network cards, line cards, portals, user equipment (e.g., computing devices, mobile devices, etc.), etc.

The larger communications network may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. User equipment 12 may send data to and/or may receive data from other nodes or terminals in the larger communications network via external communications equipment 46 (e.g., external communications equipment 46 may serve as an interface between user equipment 12 and the rest of the larger communications network). The communications network may, if desired, be operated by a corresponding network operator or service provider. The portions of communications system 10 other than user equipment 12 may sometimes be referred to herein as network equipment of communications network 10. The network equipment may include external communications equipment 46 (e.g., one or more wireless base stations) and/or one or more nodes, terminals, and/or controllers of communications system 10 (e.g., the portion of communications system 10 that does not include user equipment devices). The network equipment may include one or more processors (e.g., controllers) that perform the operations of the network equipment and/or external communications equipment 46 as described herein.

User equipment 12 may be a portable electronic device such as a cellular telephone, a portable media player, a wearable electronic device (e.g., a wristwatch, a pendant, googles or other head-mounted devices, etc.), a laptop computer, a tablet computer, a gaming controller, a remote control, an electronic navigation device, other larger electronic devices such as a desktop computer, television, set-top box, home entertainment system, server, or computer monitor, or may include electronic equipment integrated into a larger system such as a kiosk, building, or vehicle. User equipment 12 may therefore sometimes be referred to herein as user equipment (UE) device 12.

External communications equipment 46 may also be a portable electronic device such as a cellular telephone, a portable media player, a wearable electronic device (e.g., a wristwatch, a pendant, googles or other head-mounted devices, etc.), a laptop computer, a tablet computer, a gaming controller, a remote control, an electronic navigation device, other larger electronic devices such as a desktop computer, television, set-top box, home entertainment system, server, or computer monitor, may include electronic equipment integrated into a larger system such as a kiosk, building, satellite, or vehicle, may be a wireless base station, access point, relay station, or gateway, may include two or more of these, etc. Implementations in which external communications equipment 46 is a wireless base station (e.g., for conveying cellular telephone signals in one or more cellular telephone bands according to a 4G LTE communications protocol, a 3GPP 5G communications protocol, etc.) are described herein as an example. Information conveyed between UE device 12 and external communications equipment 46 may include any desired information (e.g., message data, voice data, application data, image data, video data, email data, webpage data, authentication data such as two-factor authentication codes, real-time chat data, cloud services data, sensor data, etc.).

UE device 10 may be provided with an electronic device housing such as housing 14. Housing 14, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 14 may be formed from dielectric or other low-conductivity material (e.g., glass, ceramic, plastic, sapphire, etc.). In other situations, housing 14 or at least some of the structures that make up housing 14 may be formed from metal elements.

As shown in FIG. 1, UE device 12 may include control circuitry 16, input/output devices 22, and wireless circuitry 26. UE device 12 may include a communications bus and/or other data and control paths (not shown) that couple control circuitry 16 to input/output devices 22 and wireless circuitry 26. Control circuitry 16 may include storage such as storage circuitry 20. Storage circuitry 20 may include volatile memory (e.g., static or dynamic random-access-memory), nonvolatile memory (e.g., flash memory or other electrically-programmable-read-only memory), hard drive storage, etc. Storage circuitry 20 may be integrated within UE device 12 and/or may include removable storage media. Control circuitry 16 may also include processing circuitry 18. Processing circuitry 18 may control the operation of UE device 12. Processing circuitry 18 may include one or more application specific integrated circuits, microprocessors, microcontrollers, baseband processor integrated circuits, graphics processing units, central processing units, digital signal processors, etc.

Control circuitry 16 may be used to run software on UE device 12 such as operating system functions, software applications, satellite navigation applications, internet browsing applications, voice-over-internet-protocol (VOIP) telephone call applications, email applications, media playback applications, operating system functions, etc. To support interactions with external communications equipment 46, control circuitry 16 may be used in implementing communications protocols. Communications protocols that may be implemented using control circuitry 16 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol.

Input/output devices 22 are used in providing input to and output from UE device 12 (e.g., to and/or from an end user of UE device 12). For example, input/output devices 22 may include one or more displays such as display 24. Display 24 may be a touch sensitive display, a force sensitive display, a display that is both touch sensitive and force sensitive, or a display without touch or force sensor capabilities. Display 24 may be a liquid crystal display, light emitting diode display, organic light emitting diode display, etc. Input/output devices 22 may include other components such as sensors (e.g., light sensors, proximity sensors, range sensors, image sensors, audio sensors such as microphones, force sensors, moisture sensors, temperature sensors, humidity sensors, fingerprint sensors, pressure sensors, touch sensors, ultrasonic sensors, accelerometers, gyroscopes, compasses, etc.), status indicator lights, speakers, vibrators, keyboards, touch pads, buttons, joysticks, etc.

Wireless circuitry 26 may include one or more radio-frequency transceivers 28 and one or more antennas 30 for wirelessly communicating with external communications equipment 46. Transceivers 28 may include one or more transmitters and/or one or more receivers. Antennas 30 may include any desired types of antennas such as patch antennas, dipole antennas, monopole antennas, inverted-F antennas, planar inverted-F antennas, slot antennas, helical antennas, waveguide radiators, combinations of these and/or other types of antennas. Antennas 30 may include one or more phased antenna arrays if desired (e.g., arrays of antenna elements that are sometimes referred to as phased array antennas, where the antenna elements have individually controlled phases and magnitudes that are selected to steer a corresponding signal beam in a particular direction via constructive and destructive interface across each of the antenna elements).

Transceivers 28 may be used to transmit and/or receive radio-frequency signals using antennas 30. Transceivers 28 may each be formed from respective integrated circuits or may share one or more integrated circuits. Transceivers 28 may include mixer circuitry, analog-to-digital converter circuitry, digital-to-analog transceiver circuitry, amplifier circuitry, and/or any other desired components for transmitting and/or receiving radio-frequency signals. Wireless circuitry 26 may also include baseband processor circuitry, transmission line structures, filter circuitry, switching circuitry, and/or any other desired circuitry for transmitting and/or receiving wireless radio-frequency signals using antennas 30.

If desired, each transceiver 28 may handle radio-frequency signals using different respective radio access technologies and/or communications band(s). For example, a first transceiver 28 may handle wireless local area network communications, a second transceiver 28 may handle cellular telephone communications, etc. In general, transceivers 28 may transmit and/or receive radio-frequency signals within corresponding frequency bands at radio frequencies (sometimes referred to herein as communications bands or simply as "bands"). The frequency bands handled by transceivers 28 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

The term "convey radio-frequency signals" as used herein means the transmission and/or reception of the radio-frequency signals (e.g., for performing unidirectional and/or bidirectional wireless communications with external wireless communications equipment). Antennas 30 may transmit the radio-frequency signals by radiating the radio-frequency signals into free space (or to free space through intervening device structures such as a dielectric cover layer). Antennas 30 may additionally or alternatively receive the radio-frequency signals from free space (e.g., through intervening devices structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

As shown in FIG. 1, antennas 30 on UE device 10 may convey radio-frequency signals 40 with external communications equipment 46 (e.g., for one or more corresponding wireless communications links). The radio-frequency signals 40 that are transmitted from UE device 12 to external communications equipment 46 (e.g., in uplink direction 42) may sometimes be referred to as uplink signals. The radio-frequency signals 40 that are transmitted from external communications equipment 46 to UE device 12 (e.g., in downlink direction 44) may sometimes be referred to herein as downlink signals. Radio-frequency signals 40 may convey wireless data (e.g., data organized into datagrams, packets, symbols, messages, etc. according to one or more corresponding communications protocols). Wireless data conveyed by radio-frequency signals 40 in downlink direction 44 may sometimes be referred to as downlink data. Wireless data conveyed by radio-frequency signals 40 in uplink direction 42 may sometimes be referred to herein as uplink data. Radio-frequency signals 40 may be used to perform unidirectional communications (e.g., communications in which wireless data is only sent in uplink direction 42 or downlink direction 44) and/or bidirectional communications (e.g., communications in which wireless data is sent in both uplink direction 42 and downlink direction 44 between UE device 12 and external communications equipment 46). Wireless circuitry 26 may include measurement circuitry 32 that measures wireless performance metrics using transmitted and/or received radio-frequency signals.

External communications equipment 46 may include one or more transceivers 36 that transmit radio-frequency signals 40 in downlink direction 44 using one or more antennas 38 and/or that receive radio-frequency signals in uplink direction 42 using one or more antennas 38. Antennas 38 may include any desired types of antennas such as patch antennas, dipole antennas, monopole antennas, inverted-F antennas, planar inverted-F antennas, slot antennas, helical antennas, waveguide radiators, combinations of these and/or other types of antennas, etc. Antennas 38 may include one or more phased antenna arrays if desired. Transceivers 36 may each be formed from respective integrated circuits or may share one or more integrated circuits. Transceivers 36 may include mixer circuitry, analog-to-digital converter circuitry, digital-to-analog transceiver circuitry, amplifier circuitry, and/or any other desired components for transmitting and/or receiving radio-frequency signals 40. External communications equipment 46 may also include baseband processor circuitry, transmission line structures, filter circuitry, switching circuitry, and/or any other desired circuitry for transmitting and receiving wireless radio-frequency signals using antennas 38.

External communications equipment 46 may include control circuitry such as controller 34. Controller 34 may include processing circuitry and storage circuitry similar to as described above in connection with control circuitry 16 of UE device 12. Controller 34 may also communicate with other portions of communications system 10 or other nodes or terminals (e.g., other user equipment, servers, the Internet, etc.) of the larger communications network that includes communications system 10 (e.g., using a wired and/or wireless network interface at external communications equipment 46 that is not shown in FIG. 1 for the sake of clarity). The operations of the network equipment of communications system 10 as described herein may be performed by one or more processors in controller 34 and/or control circuitry on other portions of the network equipment. External communications equipment 46 may receive downlink data from other portions of the larger communications network for transmission to UE device 12 using radio-frequency signals 40 (e.g., in downlink direction 44). Similarly, external communications equipment 46 may forward uplink data received from UE device 12 to other portions of the larger communications network (e.g., to other user equipment, servers, etc.). In this way, external communications equipment 46 may serve as an interface between UE device 12 and the rest of the larger communications network that includes communications system 10.

The example of FIG. 1 is merely illustrative. While control circuitry 16 is shown separately from wireless circuitry 26 in the example of FIG. 1 for the sake of clarity, wireless circuitry 26 may include processing circuitry (e.g., one or more processors) that forms a part of processing circuitry 18 and/or storage circuitry that forms a part of storage circuitry 20 of control circuitry 16 (e.g., portions of control circuitry 16 may be implemented on wireless circuitry 26). As an example, control circuitry 16 may include baseband circuitry (e.g., one or more baseband processors), digital control circuitry, analog control circuitry, and/or other control circuitry that forms part of transceivers 28. The baseband circuitry may, for example, access a communication protocol stack on control circuitry 16 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 26.

Figure 2:
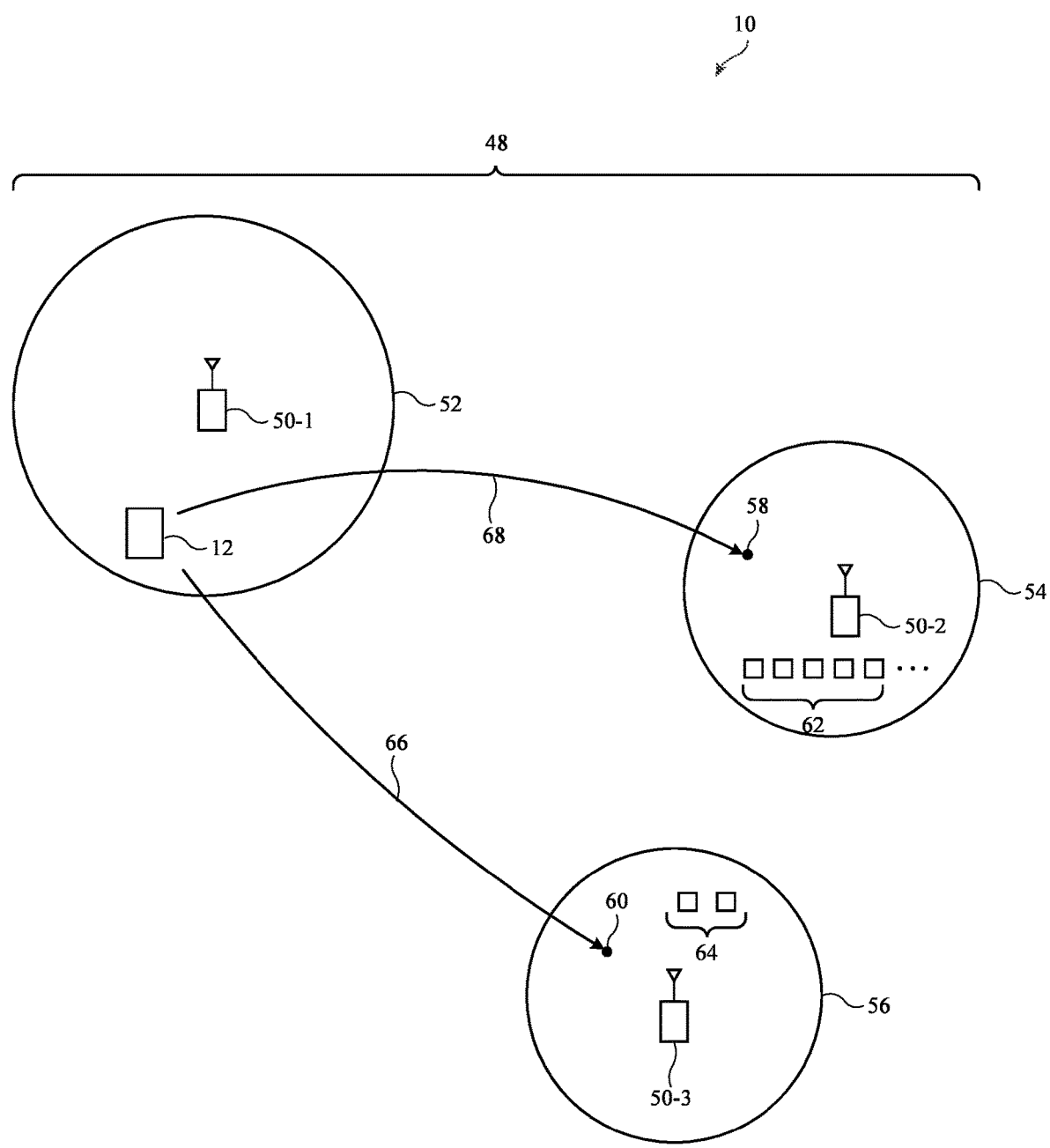
FIG. 2 is a diagram of an illustrative communications system having a user equipment device and external communications equipment such as a set of wireless base stations in respective cells in accordance with some embodiments.

FIG. 2 is a diagram showing how UE device 12 may communicate with network equipment in communications system 10 while located within a geographic region 48. As shown in FIG. 2, external communications equipment 46 of FIG. 1 may include one or more wireless base stations 50 (e.g., a first wireless base station 50-1, a second wireless base station 50-2, a third wireless base station 50-3, etc.). Each wireless base station may provide wireless coverage for UE devices located within a corresponding geographic area or region, also referred to as a cell. For example, wireless base station 50-1 may provide wireless coverage within cell 52, wireless base station 50-2 may provide wireless coverage within cell 54, and wireless base station 50-3 may provide wireless coverage within cell 56. The cells need not be circular and may, in general, have any shape.

While UE device 12 is located within cell 52, UE device 12 may communicate with wireless base station 50-1 (e.g., using radio-frequency signals 40 of FIG. 1). During operation of UE device 12, the user of UE device 12 may wish to travel to other locations within geographic region 48. For example, the user may wish to travel to location 58 within cell 54 (as shown by arrow 68). The user may, if desired, enter an input to UE device 12 that serves to inform UE device 12 and the network equipment that the user is considering travel to location 58 (e.g., by searching for information about location 58 or directions to location 58 on a web browser or navigation/map application running on UE device 12).

There may arise situations in which the user of UE device 12 may not wish to travel to location 58 should location 58 be within a geographic area that is excessively crowded. One such situation may arise during a viral pandemic such as the COVID-19 pandemic or other public health emergencies. In these situations, traveling to location 58 can pose a risk to the user's health if the population density within cell 54 is excessively high, potentially exposing the user to viral pathogens. To help the user of UE device 12 make an informed decision about whether to travel to location 58, the network equipment in communications system 10 may estimate the population density around base stations 50 based on the number of UE devices such as UE device 12 present within the cells of base stations 50. To preserve the privacy of the users of the UE devices, the network equipment may estimate these population densities based at least on the number of UE devices connected to the wireless base stations within the cells (e.g., without exposing other personal/profile information about the users themselves or their UE devices to the network equipment). In general, the more UE devices that are connected to a given wireless base station, the greater the population density within the cell of the wireless base station. The network equipment may use the estimated population density and local social distancing guidelines/protocols (e.g., as set by local or national health agencies) to provide information for the user of UE device 12 about the potential risk of exposure should the user travel to location 58.

For example, there may be a set 62 of UE devices present within cell 54 and connected to wireless base station 50-2 at a given point in time. The network equipment in communications system 10 may estimate the population density of cell 54 based on the number of UE devices connected to wireless base station 50-2 (e.g., the number of UE devices within set 62). If the number of UE devices in set 62 is excessively high (e.g., given the social distancing guidelines governing cell 54), base station 50-1 may transmit information to UE device 12 informing the user of UE device 12 that cell 54 is not a social distancing-friendly region and that the user may risk exposure to viral pathogens should the user travel to location 58. The user may then use this information to decide not to travel to location 58, or to instead travel to other locations such as location 60 within cell 56 (as shown by arrow 66).

As shown in FIG. 2, there may be a set 64 of UE devices present within cell 56 and connected to wireless base station 50-3 at a given point in time. The network equipment may estimate the population density of cell 56 based on the number of UE devices connected to wireless base station 50-3 (e.g., the number of UE devices within set 64). UE devices may be referred to herein as being connected to a wireless base station when the UE devices and the wireless base station exchange data over a cellular telephone link or other wireless link (e.g., after registering with the wireless base station and being allocated scheduling resources for conveying wireless data with the wireless base station). Such UE devices may sometimes be referred to herein as connected UE devices. If the number of UE devices in set 64 is sufficiently low (e.g., given the social distancing guidelines governing cell 54), base station 50-1 may transmit information to UE device 12 informing the user of UE device 12 that cell 56 is social distancing-friendly and that the user can travel to location 60 (as shown by arrow 66) with an acceptably low risk of exposure to viral pathogens.

In the example of FIG. 2, there are fewer UE devices within cell 56 than within cell 54. The network equipment may therefore provide information to UE device 12 that informs the user of UE device 12 that cell 56 is more social distancing-friendly than cell 54 or that otherwise informs the user of UE device 12 that it is relatively safe to travel to location 60 given local social distancing guidelines. The user may then use this information to make an informed decision to travel to location 60 rather than location 58, minimizing their exposure to viral pathogens. Each cell in geographic region 48 may have the same social distancing guidelines or different cells may have different social distancing guidelines (e.g., as set by different local municipalities, cities, towns, etc.).

Consider one example in which a user of UE device 12 searches for local grocery stores (e.g., in a navigation application, web browser, or other software application running on UE device 12). UE device 12 may transmit wireless data to base station 50-1 to perform this search. The network equipment may identify a first grocery store at location 58 and a second grocery store at location 60. The network equipment may identify that the cell containing location 58 (e.g., cell 54) has a first number of UE devices wirelessly connected to wireless base station 50-2 (e.g., UE devices within set 62). The network equipment may also identify that the cell containing location 60 (e.g., cell 56) has a second number of UE devices wirelessly connected to wireless base station 50-3 (e.g., UE devices within set 64). The network equipment may estimate the population density of cell 54 (e.g., how crowded it is at the grocery store at location 58) based at least on the size of set 62 and may estimate the population density of cell 56 (e.g., how crowded it is at the grocery store at location 60) based at least on the size of set 64.

If the population density of cell 54 exceeds a threshold level that is given by the social distancing guidelines governing cell 54, the network equipment may transmit information to UE device 12 identifying that location 58 is excessively crowded, has excessive population density, is unsafe to travel to, is not social distancing-friendly, etc. Additionally or alternatively, if the population density of cell 56 is less than a threshold level that is given by the social distancing guidelines governing cell 56, the network equipment may transmit information to UE device 12 identifying that location 60 is not excessively crowded, has sufficiently low population density, is safe to travel to, is social distancing-friendly, etc. One or more software applications running on UE device 12 (e.g., a web browser, navigation application, or other application running on UE device 12) may provide a user output (e.g., via display 24 of FIG. 1, a speaker, and/or other user output device(s) on UE device 12) to inform the user of UE device 12 of these social distancing conditions. The user may then use this information to make an informed decision on whether to travel to the grocery store at location 58 or the grocery store at location 60 for their grocery shopping.

Figure 3:
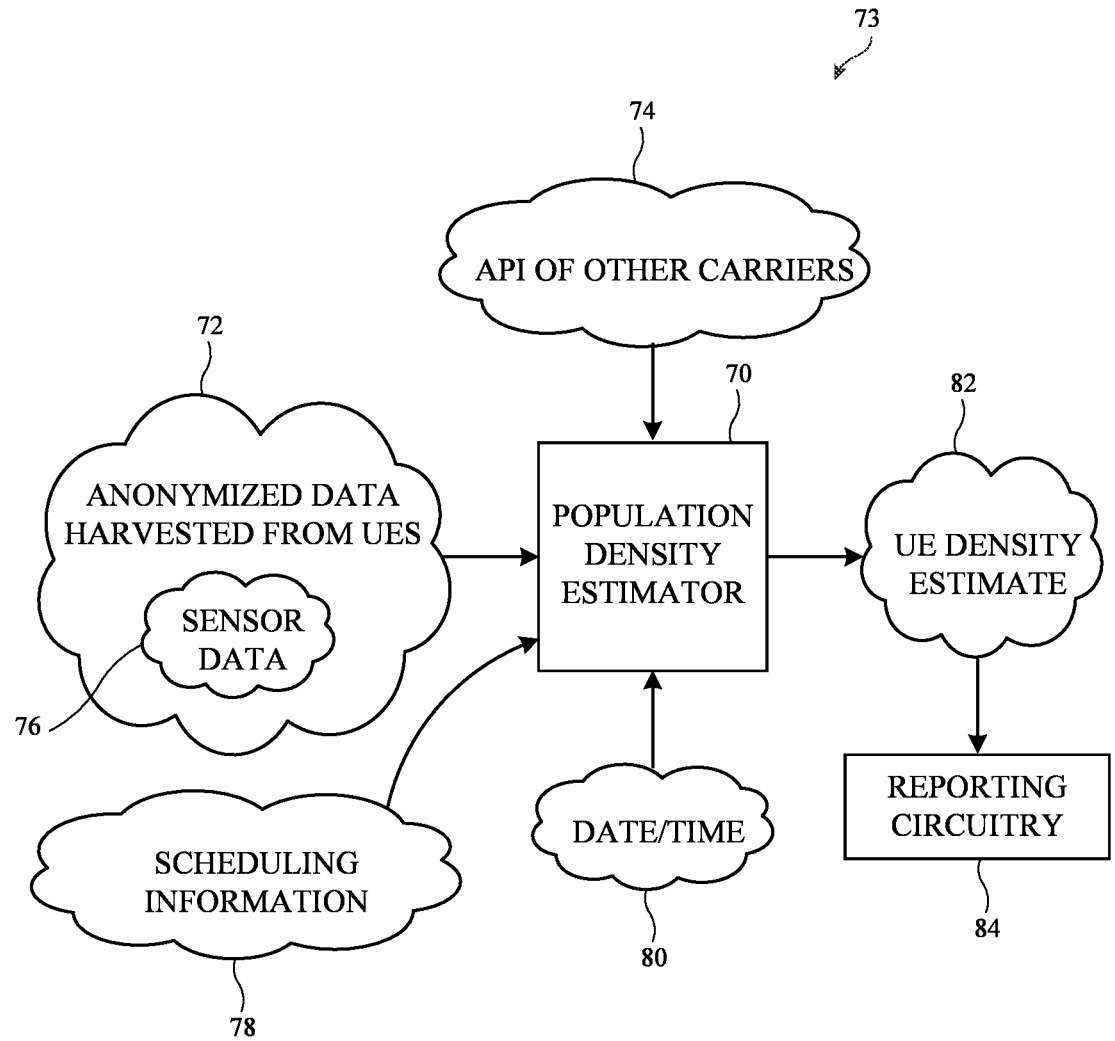
FIG. 3 is a diagram showing how illustrative network equipment may have a population density estimator for identifying cells with satisfactory or unsatisfactory social distancing conditions in accordance with some embodiments.

FIG. 3 is a diagram showing how network equipment in communications system 10 may process a set of inputs to estimate social distancing conditions (e.g., population density). As shown in FIG. 3, communication system 10 may include network equipment 73 (e.g., one or more base stations such as base stations 50 of FIG. 2 and/or equipment implemented on one or more other network nodes or terminals).

Network equipment 73 may include a population density estimator 70. Population density estimator may be implemented in hardware and/or software on network equipment 73 (e.g., using digital logic, analog circuitry, one or more processors, etc.). Population density estimator 70 may receive application programming interface (API) 74, harvested data 72, scheduling information 78, and/or date/time information 80.

Harvested data 72 may include anonymized data that is harvested (e.g., collected, retrieved, received, fetched, etc.) from UE devices 12 (e.g., UE device 12 and sets 62 and 60 as shown in FIG. 2). Each of these UE devices may communicate with the same network carrier or operator that performs data harvesting from the UE devices (e.g., the network carrier that operates network equipment 73 and population density estimator 70, which may be the network carrier associated with the operating system running on each of UE devices 12). The number of UE devices 12 connected to each wireless base station 50 may sometimes be referred to herein as the connection count of that wireless base station 50. Harvested data 72 may include information identifying the number of UE devices 12 connected to each wireless base station 50 in communications system 10 (e.g., the connection count of wireless base station 50-2 of FIG. 2, which is indicative of the size of set 62, and the connection count of wireless base station 50-3 of FIG. 2, which is indicative of the size of set 64). For example, harvested data 72 may include time stamp information (e.g., time stamps transmitted by each of the connected UE devices 12), globally unique cell identifiers (e.g., a cell global identity (CGI)) for each wireless base station (e.g., information identifying the wireless base stations 50 to which the UE devices 12 are connected), information identifying the bandwidth consumed by each UE device 12, and/or sensor data such as sensor data 76.

Sensor data 76 may include data gathered by one or more sensors on UE devices 12 (e.g., in measurement circuitry 32 of FIG. 1). The sensor data may be indicative of the number of other UE devices 12 nearby to any given UE device 12 (e.g., each UE device 12 may periodically and autonomously gather data that identifies the number of other UE devices 12 within radio-frequency range of that UE device 12). The sensor data may, for example, be gathered using Bluetooth, NFC, and/or ultra-wideband signals transmitted and/or received by each UE device (e.g., the sensor data may be radio-frequency sensor data). Harvested data 72 does not include any information that specifically identifies the particular UE devices connected to the wireless base stations or the users of the UE devices. Network equipment 73 may process harvested data 72 to identify connection counts for each wireless base station. This information is completely devoid of identifying details associated with the UE devices themselves or the users of the UE devices, thereby protecting user privacy.

Network equipment 73 may, for example, use harvested data 72 to identify that wireless base station 50-2 (FIG. 2) has a first connection count indicative of the number of UE devices 12 in cell 54 that are wirelessly connected to wireless base station 50-2 (e.g., the size of set 62), to identify that wireless base station 50-3 has a second connection count indicative of the number of UE devices 12 in cell 56 that are wirelessly connected to wireless base station 50-3 (e.g., the size of set 64), etc. This may be repeated for each of the wireless base stations (cells) in communications system 10 or for a subset of the wireless base stations (cells) in communications system 10.

While connection count gives the number of UE devices 12 connected to each wireless base station, there may be other information indicative of the presence of people within the cells of the wireless base stations who are not otherwise included in the connection counts. For example, API 74 may include an API from one or more network carriers other than the network carrier operating population density estimator 70 (e.g., carriers other than the carrier that interfaces with UE devices 12 such as carriers that handle communications with user equipment devices running other operating systems than the operating system of UE devices 12). API 74 may include information identifying or estimating the number of these other user equipment devices which may be present in each of the cells of communications system 10, as such user equipment devices will not be included in the connection counts.

Scheduling information 78 may be provided to population density estimator 70 from each of the wireless base stations 50 (FIG. 2). Scheduling information 78 may include information about data allocation between the UE devices connected to the wireless base station, data congestion patterns, etc. Time/date information 80 may also be provided to population density estimator 70. Time/date information 80 may include information identifying the current time, date, season, etc.

Population density estimator 70 may estimate the population density of each cell in communications system 10 based on harvested data 72, API 74, scheduling information 78, and/or date/time information 80. For example, population density estimator 70 may estimate the population density of cell 54 of FIG. 2 based on the area of cell 54 and an estimate of the total number of people within cell 54 (e.g., where population density is given by the total number of people divided by area). Population density estimator 70 may estimate the total number of people within cell 54 based on the connection count of wireless base station 50-2 identified by harvested data 72, sensor data 76, API 74, date/time information 80, and scheduling information 78.

For example, population density estimator 70 may estimate the total number of people as the sum of the connection count (indicative of the number of UE devices 12 in set 62 of FIG. 2 connected to wireless base station 50-2), the number of other UE devices 12 that are nearby to the connected UE devices 12 in set 62 of FIG. 2 but that are not otherwise connected to wireless base station 50-2, and the number of user equipment devices operated by other network carriers as identified by API 74. If desired, population density estimator 70 may further adjust, extrapolate, interpolate, or tweak the estimated total population using scheduling information 78 (e.g., by increasing the estimated total population when scheduling information 78 identifies that there is high data congestion within cell 54 when there is a relatively high amount of traffic in the cell) and/or date/time information 80 (e.g., by increasing the estimated total population when the date or time indicates that more people are likely to be present within cell 54, such as when cell 54 is located within a park and the date/time indicates that it is daytime during a summer month). Population density estimator 70 may then divide the estimated total population of cell 54 by the area of cell 54 to estimate the population density of cell 54. Population density estimator may repeat this process for each of the cells and wireless base stations in communications system 10 to produce (e.g., generate, estimate, output, compute, calculate, etc.) UE density estimate 82.

Population density estimator 70 may provide UE density estimate 82 to reporting circuitry 84. Reporting circuitry 84 may compare the estimated population density of each cell to a threshold. The threshold may be determined by the social distancing protocol governing each cell. Reporting circuitry 84 may report information identifying cells that are not social distancing-friendly and/or that are social distancing-friendly to one or more UE devices 12. Reporting circuitry 84 may be implemented on one or more wireless base stations, for example.

Figure 4:
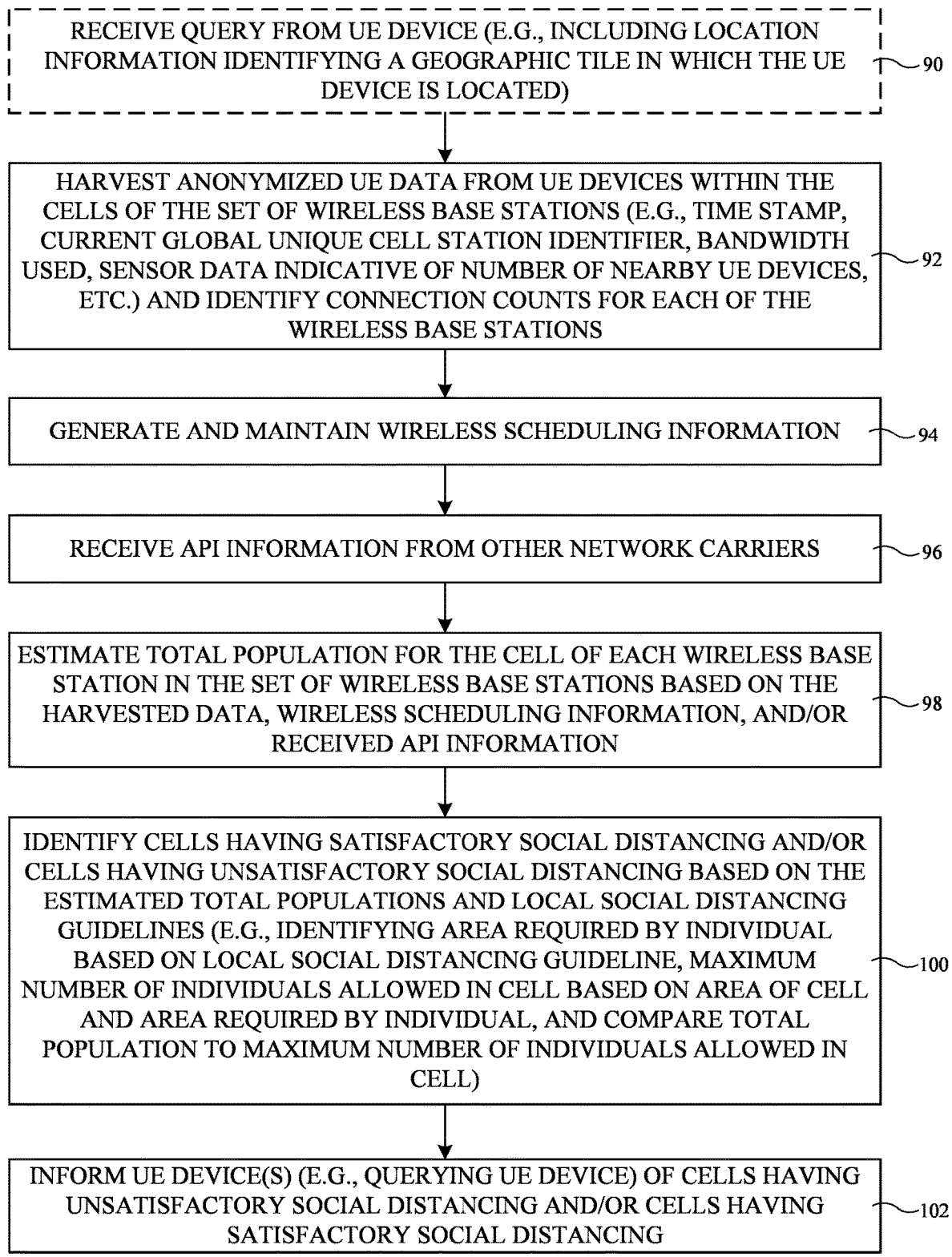
FIG. 4 is a flow chart of illustrative operations that may be performed by network equipment to inform one or more user equipment devices about the social distancing conditions of one or more geographic areas while preserving user privacy in accordance with some embodiments.

FIG. 4 is a flow chart of illustrative operations that may be performed by network equipment 73 to inform one or more UE devices such as UE device 12 within cell 52 of FIG. 2 about the social distancing conditions of one or more geographic areas (cells) such as cells 54 and 56 of FIG. 2 (while preserving user privacy). Network equipment 73 may include population density estimator 70 of FIG. 3 and one or more wireless base stations 50 of FIG. 2.

At optional operation 90, wireless base station 50-1 (FIG. 2) may receive a query from UE device 12. UE device 12 may transmit the query when the user of UE device 12 is looking up a particular location in a web browser, navigation/mapping application, or other software application running on UE device 12, as examples. The query may, for example, include location information identifying the location of UE device 12. The location information may be fuzzed or obscured to shield the precise location of UE device 12 for privacy purposes. For example, UE device 12 may identify a geographic tile in which the UE device is located. The tile may be any size (e.g., 75 m-by-75 m). Operation 90 may be omitted if desired (e.g., network equipment 73 may push information identifying non-social distancing-friendly regions to UE device 12 autonomously and/or periodically). Operation 90 may be performed after or concurrently with any of the operations of FIG. 4.

At operation 92, network equipment 73 (FIG. 3) may gather (e.g., harvest, retrieve, fetch, or otherwise actively and/or passively receive) harvested data 72 (FIG. 3) from the UE devices 12 within the cells of a set of wireless base stations 50 (e.g., periodically, according to a schedule, on demand, in the background while the UE devices are otherwise operating, etc.). If desired, population density estimator 70 may identify (e.g., produce, generate, estimate, compute, calculate, etc.) the connection count for each wireless base station 50 in the set of wireless base stations 50 based on harvested data 72. The set of wireless base stations 50 may include all the wireless base stations in communications system 10 or a subset of all the wireless base stations in communications system 10. In general, at least some of harvested data 72 is periodically gathered from any UE devices 12 that are wirelessly connected to a wireless base station 50 in the communications system (e.g., the operating system of UE devices 12 may instruct UE devices 12 to periodically transmit this information to network equipment 73). Alternatively, when network equipment 73 receives a query from UE device 12 (at operation 90) that identifies a particular location, the set of wireless base stations 50 may include wireless base station(s) having cells at and/or adjacent to the particular location. For example, if the query identifies that the user is searching for grocery stores, the set of wireless base stations may include those wireless base stations 50 having cells that overlap each of the grocery stores in the vicinity of the querying UE device 12. As another example, if the query identifies that the user is searching for directions to a particular park, the set of wireless base stations may include the wireless base station 50 having a cell that overlaps that particular park and/or adjacent wireless base stations. As yet another example, the set of wireless base stations may include wireless base stations having cells adjacent to the geographic tile in which the querying UE device 12 is located.

Population density estimator 70 may use harvested data 72 of FIG. 3 to identify the connection counts for each wireless base station in the set of wireless base stations. For example, the harvested data may include data produced by each connected UE device, where the data includes a time stamp for the communications performed by the UE device and a corresponding globally unique cell identifier identifying the wireless base station used to communicate with the UE device. Population density estimator 70 may use the time stamps and the globally unique cell identifiers to identify how many UE devices 12 are connected to each wireless base station (each globally unique cell identifier) in the set of wireless base stations at a given time, thereby giving the connection count for each wireless base station. As time stamps and globally unique cell identifiers do not reveal any information about the identity of particular UE devices 12 or the users of the UE devices, the connection counts allow network equipment 73 to estimate total population within the cells of the set of wireless base stations 50 while protecting user privacy.

The harvested data 72 collected by network equipment 73 may also include sensor data 76 (FIG. 3). This sensor data may identify the presence of UE devices 12 that are nearby to the connected UE devices but that are not themselves connected to the wireless base station. This may allow network equipment 73 to better estimate total population within the cells of the set of wireless base stations by including users with UE devices 12 that are not wirelessly connected to the wireless base stations. This sensor data may also be devoid of information identifying the users of UE devices 12.

At operation 94, network equipment 73 may generate and maintain wireless scheduling information 78 (FIG. 3). Wireless base stations 50 may generate wireless scheduling information 78 (e.g., as one or more wireless communications schedules) and may report the wireless scheduling information to population density estimator 70.

At operation 96, population density estimator 70 may receive API 74 (FIG. 3) from one or more other network carriers.

At operation 98, population density estimator 70 may estimate the total population within the cell of each wireless base station 50 in the set of wireless base stations based on harvested data 72, sensor data 76, scheduling information 78, date/time information 80, and/or API 74 (FIG. 3).

Consider the example of FIG. 2, in which the set of wireless base stations includes at least wireless base station 50-2 having cell 54 and wireless base station 50-3 having cell 56. In this example, population density estimator 70 may estimate (e.g., compute, calculate, generate, identify, etc.) the total population of cell 54 by adding the connection count of wireless base station 50-2 (e.g., as identified from harvested data 72 at operation 92), which is indicative of the number of connected UE devices 12 in cell 54 (e.g., the UE devices 12 in set 62 that are connected to wireless base station 50-2 via cellular links), to the number of UE devices 12 that are nearby to the connected UE devices in cell 54 but that are not otherwise connected to wireless base station 50-2 (e.g., as identified by the sensor data 76 harvested from the UE devices 12 in cell 54 at operation 92), and to the number of user equipment devices of other carriers within cell 54 as identified by API 74. Population density estimator 70 may adjust the estimated total population based on date/time information 80 and/or scheduling information 78 if desired.

Similarly, population density estimator 70 may estimate the total population of cell 56 by adding the connection count of wireless base station 50-3 (e.g., as identified from harvested data 72 at operation 92), which is indicative of the number of connected UE devices 12 in cell 56 (e.g., the UE devices 12 in set 64 that are connected to wireless base station 50-3 via cellular links), to the number of UE devices 12 that are nearby to the connected UE devices 12 in cell 56 but that are not otherwise connected to wireless base station 50-3 (e.g., as identified by the sensor data 76 harvested from the UE devices 12 in cell 56 at operation 92), and to the number of user equipment devices of other carriers within cell 56 as identified by API 74. Population density estimator 70 may adjust the estimated total population based on date/time information 80 and/or scheduling information 78 if desired.

At operation 100, population density estimator 70 may identify the social distancing conditions for the cells of each wireless base station in the set of wireless base stations based on the estimated total populations of the cells and local social distancing guidelines for each of the cells. For example, population density estimator 70 may identify cells having satisfactory social distancing conditions and/or cells having unsatisfactory social distancing conditions.

A public health agency such as the Center for Disease Control (CDC) or another governing body may issue local social distancing guidelines, rules, or laws governing the regions where cells 54 and 56 are located. The social distancing guideline may require that people of different households maintain a safe distance of d feet between each other. Distance d may be six feet, one-and-a-half meters, or other distances, for example.

Population density estimator 70 may identify the area required by an individual within each cell of the set of wireless base stations based on distance d (e.g., as given by the social distancing guidelines). Population density estimator 70 may identify (e.g., calculate, compute, generate, produce, output, etc.) the area required by an individual using the expression $\pi*d^2$, where "*" is the multiplication operator. In an example where d=6 feet, the area required by an individual is 113.04 ft$^2$ (or 10.5 m$^2$).

Population density estimator 70 may identify (e.g., calculate, compute, generate, produce, output, etc.) the maximum number of individuals u allowed in each cell of the set of wireless base stations by dividing the total area of each cell by the area required by an individual within that cell under the social distancing guidelines (e.g., where the maximum number of individuals allowed in a given cell under the social distancing guidelines is given by $u=A/(\pi*d^2)$, where A is the total area of that cell).

Population density estimator 70 may identify whether each cell has satisfactory social distancing conditions or unsatisfactory social distancing conditions by comparing the total population of that cell to the maximum number of individuals allowed in the cell under the social distancing guidelines. If the total population estimated for a given cell (e.g., as estimated at operation 98) is greater than or equal to the maximum number of individuals allowed in that cell under the social distancing guidelines (e.g., value u), then that cell may be labeled as a non-social distancing-friendly cell, a cell having excessive crowding, an unsafe cell, etc. If the total population estimated for a given cell (e.g., as estimated at operation 98) is less than the maximum number of individuals allowed in that cell under the social distancing guidelines (e.g., value u), then that cell may be labeled as a social distancing-friendly cell, a cell having acceptably low crowding, a safe cell, etc.

Each cell may have the same distance d or may have different distances d (e.g., when different local social distancing guidelines apply to different cells). Consider the example of FIG. 2 described above, in which the set of wireless base stations includes at least wireless base station 50-2 having cell 54 and wireless base station 50-3 having cell 56, and in which a first social distancing guideline governs cell 54 and dictates that individuals maintain a safe distance d1 between each other whereas a second social distancing guideline governs cell 56 and dictates that individuals maintain a safe distance d2 between each other. Cell 54 may have a first area A1 whereas cell 56 has a second area A2. The area of each cell may vary depending on the frequency used for communications (e.g., lower frequencies may produce larger cell areas than higher frequencies).

In this example, population density estimator 70 may estimate that cell 54 has a first total population P1 and that cell 56 has a second total population P2 (e.g., while processing operation 98). Population density estimator 70 may compute the maximum number of individuals allowed within cell 54 under the first social distancing guideline u1 using the formula $u1=A1/(\pi*d1^2)$. Population density estimator 70 may compute the maximum number of individuals allowed within cell 56 under the second social distancing guideline u2 using the formula $u2=A2/(\pi*d2^2)$. If T1 exceeds u1 (e.g., if set 62 of FIG. 2 is excessively large), cell 54 may be labeled as a non-social distancing-friendly region. If T1 is less than u2 (e.g., if set 62 of FIG. 2 is sufficiently small), cell 54 may be labeled as a social distancing-friendly region or cell. Similarly, if T2 exceeds u2 (e.g., if set 64 of FIG. 2 is excessively large), cell 56 may be labeled as a non-social distancing-friendly region. If T2 is less than u2 (e.g., if set 64 of FIG. 2 is sufficiently small), cell 56 may be labeled as a social distancing-friendly region or cell.

At operation 102, network equipment 73 may inform one or more UE devices 12 (e.g., the UE device that transmitted the query received at operation 90) about the social distancing conditions for the cells of the set of wireless base stations. For example, network equipment 74 may transmit information to the UE device 12 identifying which of the cells are non-social distancing-friendly and/or may transmit information to the UE device 12 identifying which of the cells are social distancing-friendly. UE device 12 may then use this information to inform its user of the social distancing conditions so the user can make an informed decision about their own movement or travel.

For example, if cell 54 of FIG. 2 is non-social distancing-friendly (e.g., if T1≥u1), wireless base station 50-1 may provide downlink signals to UE device 12 in cell 52 informing UE device 12 that location 58 is non-social distancing-friendly. Additionally or alternatively, if cell 56 of FIG. 2 is social distancing-friendly (e.g., if T2<u2), wireless base station 50-1 may provide downlink signals to UE device 12 in cell 52 informing UE device 12 that location 60 is social distancing-friendly. The user of UE device 12 may use this information to avoid location 58 and/or to travel to location 60 instead, thereby minimizing their exposure to potentially dangerous pathogens.

Figure 5:
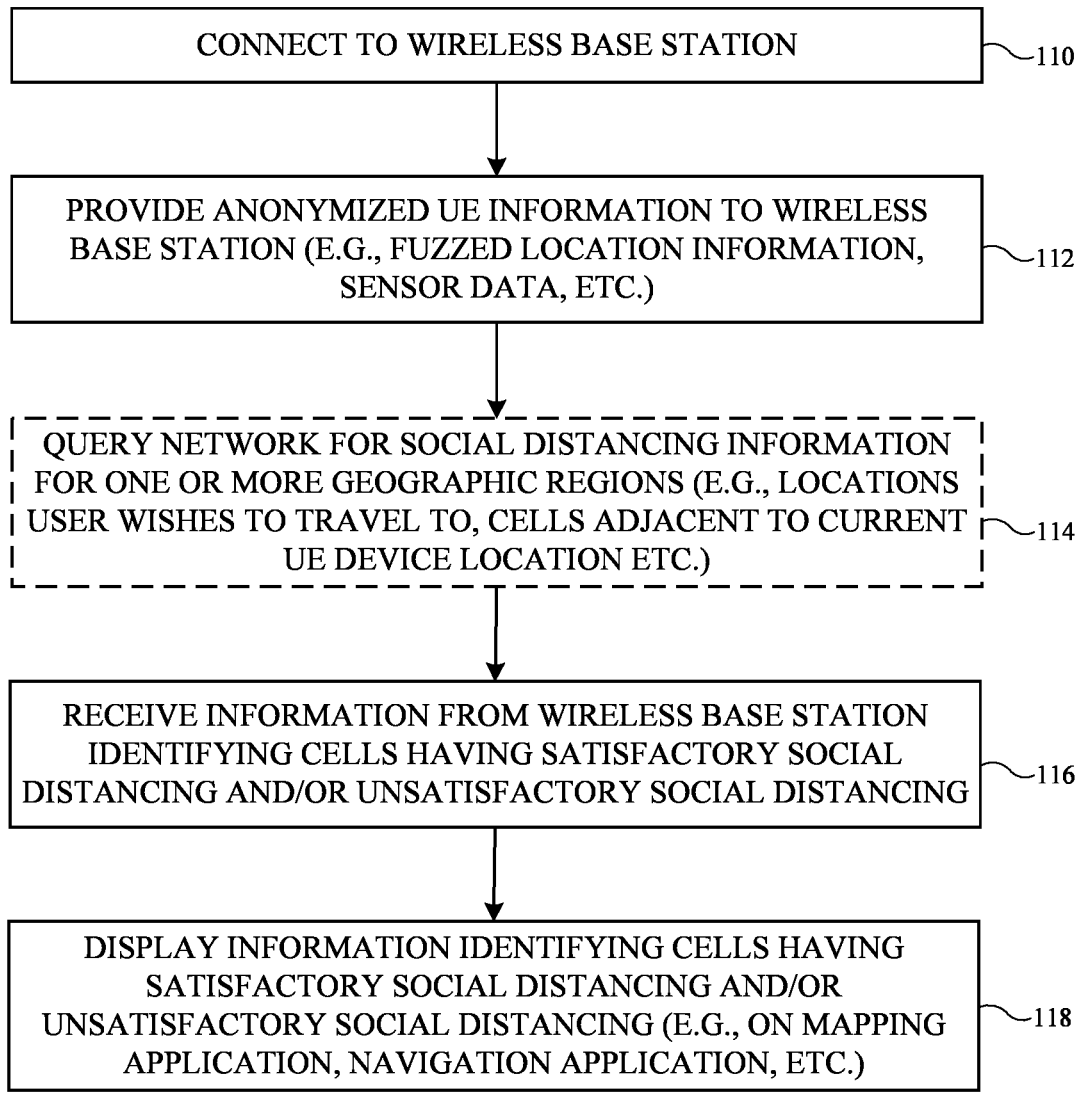
FIG. 5 is a flow chart of illustrative operations that may be performed by a user equipment device to display information about the social distancing conditions of one or more geographic areas as identified by network equipment while preserving user privacy in accordance with some embodiments.

FIG. 5 is a flow chart of illustrative operations that may be performed UE device 12 in cell 52 of FIG. 2 to display information about the social distancing conditions of one or more geographic areas as identified by network equipment 73 while preserving user privacy.

At operation 110, UE device 12 may connect with wireless base station 50-1 while in cell 52 (e.g., over a cellular telephone link).

At operation 112, UE device 12 may provide anonymized UE information to wireless base station 50-1 (e.g., as harvested by network equipment 73 while processing operation 92 of FIG. 4). The information harvested by the network equipment may include a time stamp associated with the communication between UE device 12 and wireless base station 50-1 and a globally unique cell identifier that uniquely identifies wireless base station 50-1 and/or its cell 52. If desired, UE device 12 may provide fuzzed location information to wireless base station 50-1. For example, UE device 12 may provide information identifying a geographic tile within which UE device 12 is located. If desired, UE device 12 may generate sensor data that identifies the presence of other UE devices 12 in its vicinity (e.g., UE devices 12 that are not currently connected to UE device 50-1) and may transmit the sensor data to wireless base station 50-1 (e.g., network equipment 73 may harvest the sensor data as sensor data 76 of FIG. 3). This information may not specifically identify UE device 12 or its user (e.g., the UE information is anonymized).

At optional operation 114, UE device 12 may query network equipment 73 for social distancing information about one or more geographic regions. The geographic regions may include one or more locations that the user of UE device 12 wishes to travel to and/or one or more cells at, near, or adjacent to UE device 12. For example, when the user of UE device 12 looks up locations 58 and 60 of FIG. 2 in a mapping, web browser, or navigation application running on UE device 12, this may query network equipment 73 to provide information about the social distancing conditions at locations 58 and 60 (e.g., the social distancing conditions of cells 54 and 56). Additionally or alternatively, UE device 12 may autonomously transmit the query. UE device 12 may transmit the query in uplink signals provided to wireless base station 50-1, which may be received by network equipment 73 while processing operation 90 of FIG. 4. If desired, operation 114 may be omitted (e.g., network equipment 73 may provide social distancing information for one or more cells to UE device 12 periodically, when a cell adjacent to UE device 12 is non-social distancing-friendly, or in response to any desired trigger condition).

At operation 116, UE device 12 may receive information from wireless base station 50-1 identifying the social distancing conditions of one or more locations (cells). For example, UE device 12 may receive information from wireless base station 50-1 identifying which of the queried geographic regions are non-social distancing-friendly and/or which of the queried geographic regions are social distancing-friendly. As another example, UE device 12 may receive information from wireless base station 50-1 identifying that one or more cells adjacent to UE device 12 is non-social distancing-friendly. This information may be transmitted by network equipment 73 (e.g., wireless base station 50-1) while processing operation 102 of FIG. 4.

At operation 118, display 24 on UE device 12 may display information identifying the social distancing conditions received at operation 116. For example, display 24 may display information identifying cells that are non-social distancing-friendly and/or cells that are social distancing-friendly. The information may be displayed as a push notification, a banner notification, on a map or navigation application running on UE device 12, etc.

Figure 6:
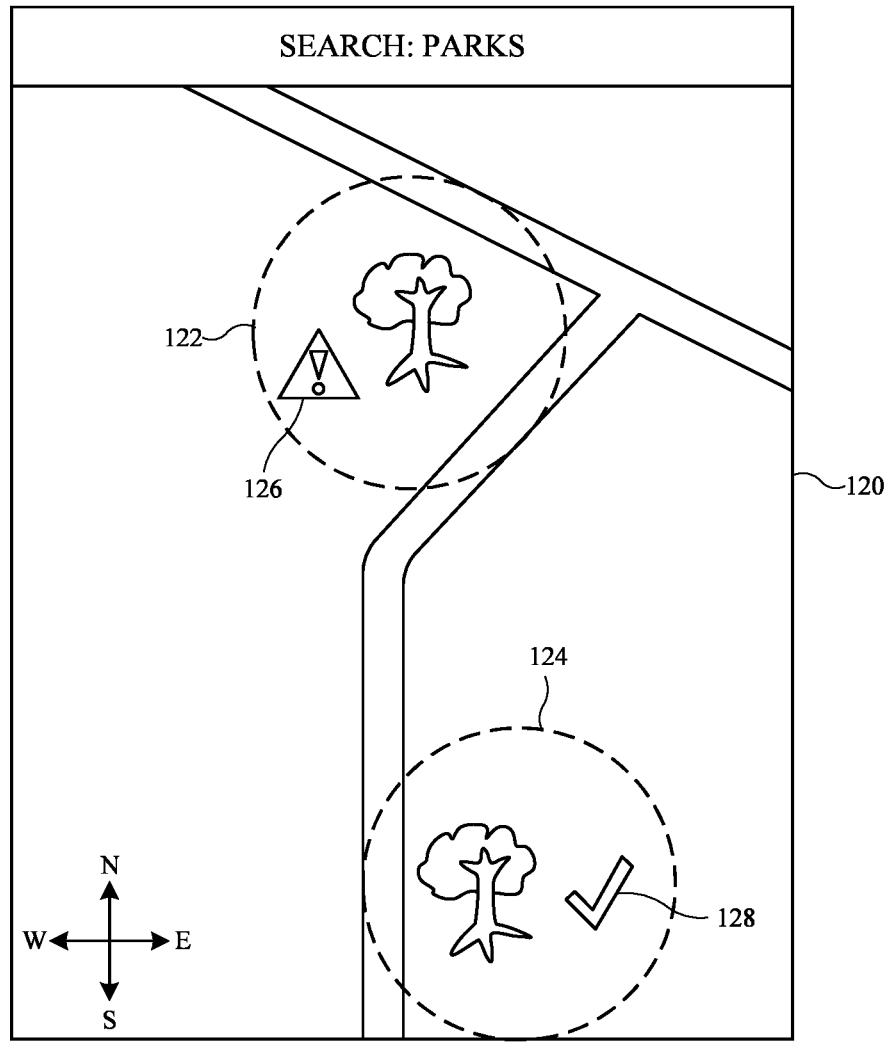
FIG. 6 is a diagram of an illustrative graphical user interface that may be generated by user equipment to identify, to a user, the social distancing conditions of one or more geographic regions as identified by network equipment while preserving user privacy in accordance with some embodiments.

FIG. 6 shows an example of a graphical user interface that may be displayed on display 24 while processing operation 118 of FIG. 5. As shown in FIG. 6, a graphical user interface (GUI) such as graphical user interface 120 may be displayed on display 24 (e.g., by software such as a navigation or map application running on control circuitry 16).

In the example of FIG. 6, graphical user interface 120 displays a map of the geographic area in which locations 58 and 60 of FIG. 2 are located. For example, a user of UE device 12 may have searched for nearby parks in a map application. The map application may display a first park 122 at location 58 (FIG. 2) and a second park 124 at location 60 (FIG. 2) using graphical user interface 120. In this example, cell 54 is non-social distancing-friendly (e.g., the relatively high number of UE devices 12 in set 62 may cause the total population estimated for cell 54 of FIG. 2 to exceed the maximum number of individuals allowed in cell 54 under local social distancing guidelines as processed at operation 100 of FIG. 4), whereas cell 56 is social distancing-friendly (e.g., the relatively low number of UE devices 12 in set 64 may cause the total population estimated for cell 56 of FIG. 2 to be less than the maximum number of individuals allowed in cell 56 under local social distancing guidelines as processed at operation 100 of FIG. 4).

Graphical user interface 120 may display an alert, flag, warning, or other graphical element 126 (e.g., an icon, banner, shape, video, image, text, pin, circle, animation, and/or other visual indicators) to identify to the user of UE device 12 that park 122 is non-social distancing-friendly (e.g., that park 122 is excessively crowded). Additionally or alternatively, graphical user interface 120 may display a graphical element 128 (e.g., an icon, banner, shape, video, image, text, pin, circle, animation, and/or other visual indicators) to identify to the user of UE device 12 that park 124 is social distancing-friendly (e.g., that park 122 is not excessively crowded). This graphical information may help the user of UE device 12 to make an informed decision about which park to travel to while minimizing exposure to pathogens. The user may subsequently enter an input instructing the map application to generate directions from the current location of UE device 12 to park 124, for example. The example of FIG. 6 in which graphical indicators are used is merely illustrative. Acoustic/audio, haptic, and/or any other desired indicators may be used to inform the user of UE device 12 about social distancing conditions.

Figure 7:
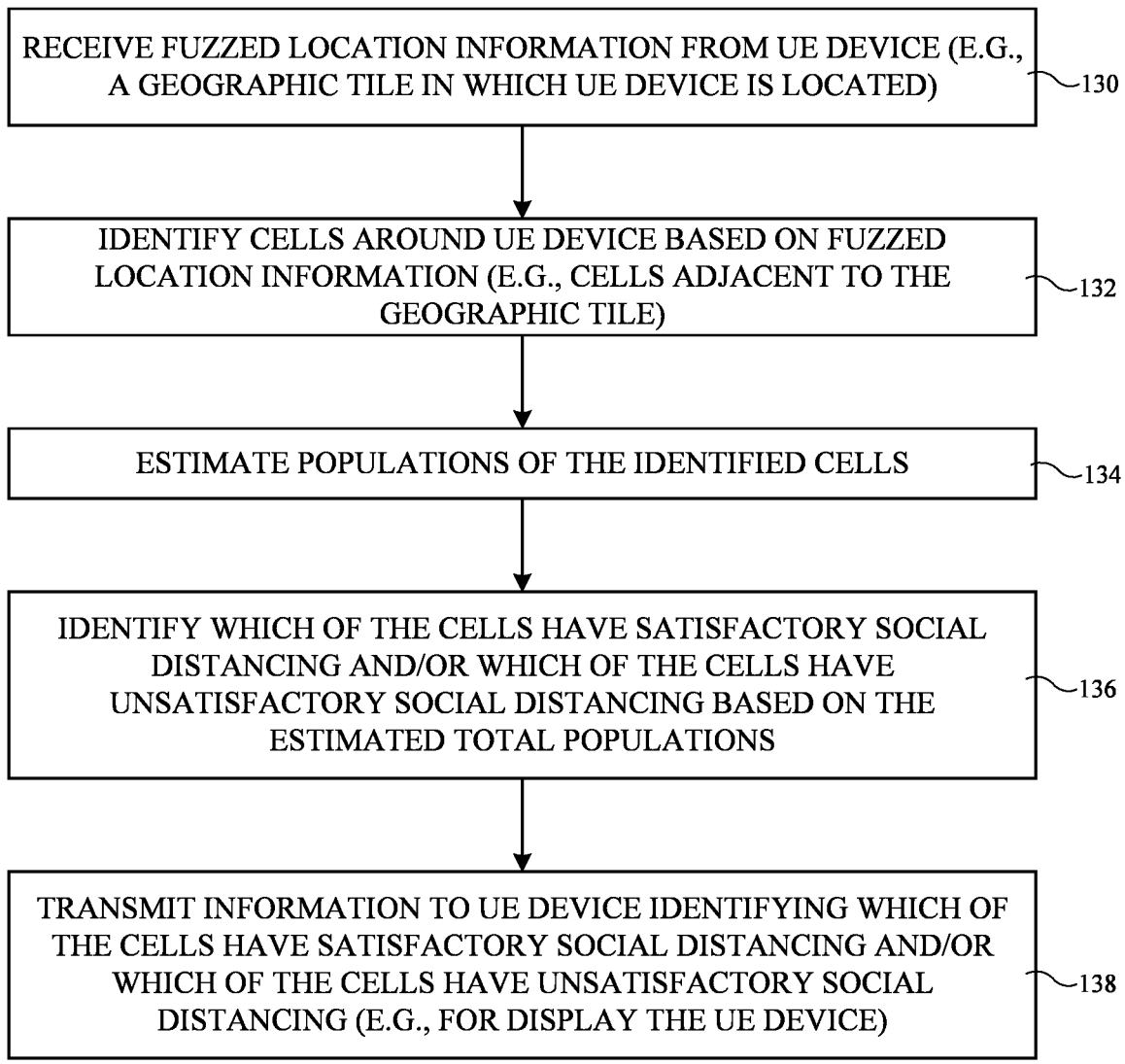
FIG. 7 is a flow chart of illustrative operations that may be performed by network equipment to inform a user equipment device of the social distancing conditions of geographic areas adjacent to the user equipment device while preserving user privacy in accordance with some embodiments.

In some examples, network equipment 73 may use the location of UE device 12 to warn the user of UE device 12 when nearby areas are non-social distancing-friendly. This may, for example, allow the user of UE device 12 to preemptively avoid these areas. FIG. 7 is a flow chart of illustrative operations that may be performed by network equipment 73 to inform UE device 12 when nearby areas are non-social distancing-friendly.

At operation 130, network equipment 73 may receive fuzzed location information from UE device 12 (e.g., while processing operation 90 of FIG. 4). The fuzzed location information may include a geographic tile within which UE device 12 is located, but that otherwise hides the precise location of UE device 12 from the network equipment to protect the user's privacy. UE device 12 may transmit this information while processing operation 112 of FIG. 5, for example.

At operation 132, network equipment 73 may identify one or more cells around UE device 12 based on the fuzzed location information. For example, network equipment 73 may identify one or more cells overlapping, at, adjacent, and/or nearby to the geographic tile of UE device 12 for further processing. The wireless base stations 50 of the identified cells may, for example, form the set of wireless base stations processed in the operations of FIG. 4.

At operation 134 of FIG. 7, network equipment 73 may estimate (e.g., compute, calculate, output, generate, produce, etc.) the total populations of the identified cells (e.g., while processing operation 98 of FIG. 4, where the wireless base stations of the identified cells form the set of wireless base stations processed at operation 98 of FIG. 4).

At operation 136 of FIG. 7, network equipment 73 may identify the social distancing conditions of the identified cells based on the total populations of the cells, the area of the cells, and the local social distancing guidelines governing the cells (e.g., while processing operation 100 of FIG. 4). For example, network equipment 73 may identify which of the cells are social distancing-friendly and which of the cells are non-social distancing-friendly (e.g., while preserving user privacy and shielding the network from personal information identifying or about the users of the UE devices).

At operation 138, network equipment 73 may transmit information to UE device 12 identifying which of the cells are non-social distancing-friendly (e.g., while processing operation 102 of FIG. 4). Additionally or alternatively, network equipment 73 may transmit information identifying which of the cells are social distancing-friendly. UE device 12 may then display information identifying, for the user of UE device 12, regions at, adjacent, or nearby to UE device 12 that are non-social distancing-friendly and/or regions that are social distancing-friendly (e.g., while processing operation 138 of FIG. 7).

Figure 8:
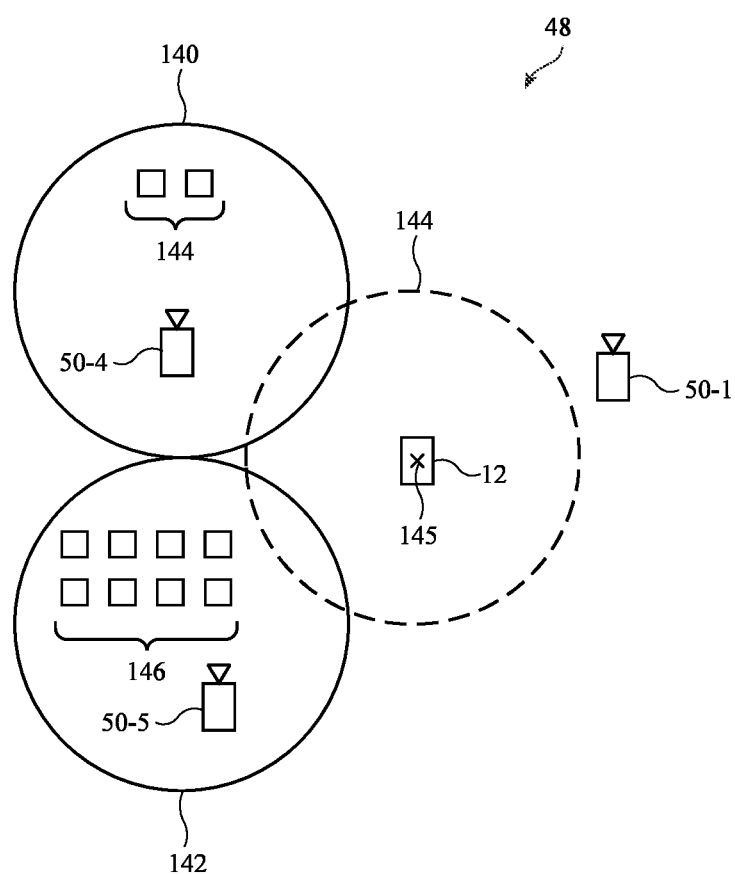
FIG. 8 is a diagram showing how cells adjacent to a user equipment device may have different social distancing conditions in accordance with some embodiments.

FIG. 8 is a diagram of geographic region 48 showing one example of how network equipment 73 may inform UE device 12 about the social distancing conditions of nearby areas. In the example of FIG. 8, UE device 12 may be located at location 145 in geographic region 48. UE device 12 may transmit fuzzed location information to network equipment 73 (e.g., wireless base station 50-1). The fuzzed location information may identify that UE device 12 is located within geographic tile 144 without revealing the precise location 145 to the network equipment. Geographic tile 144 may have any desired shape and may be, as one example, a 75 m-by-75 m tile.

Network equipment 73 may receive information identifying geographic tile 144 from UE device 12 while processing operation 130 of FIG. 7. Network equipment 73 may identify at least a first cell 140 and a second cell 142 overlapping or adjacent to geographic tile 144 (e.g., while processing operation 132 of FIG. 7). Cell 140 may be covered by wireless base station 50-4. Cell 142 may be covered by wireless base station 50-5. There may be a set of UE devices 144 in cell 140 and a set of UE devices 146 in cell 142.

Network equipment 73 may estimate the total number of individuals (total population) in cell 140 (e.g., the number of UE devices in the set of UE devices 144) and may estimate the total number of individuals in cell 142 (e.g., the number of UE devices in the set of UE devices 146) while processing operation 134 of FIG. 7.

In the example of FIG. 8, cell 142 has a higher population than cell 140. If the total population density of cell 142 exceeds a threshold level (e.g., if the total population estimated for cell 142 exceeds the maximum number of individuals allowed in cell 142 given its area and the local social distancing guidelines for cell 142), network equipment 73 may identify that cell 142 is non-social distancing-friendly (e.g., while processing operation 136 of FIG. 7). If the total population density of cell 140 does not exceed the threshold level (e.g., if the total population estimated for cell 140 is less than the maximum number of individuals allowed in cell 140 given its area and the local social distancing guidelines for cell 140), network equipment 73 may identify that cell 140 is social distancing-friendly. Network equipment 73 (e.g., wireless base station 50-1) may inform UE device 12 of the social distancing conditions of cells 140 and 142 (e.g., while processing operation 138 of FIG. 7).

Figure 9:
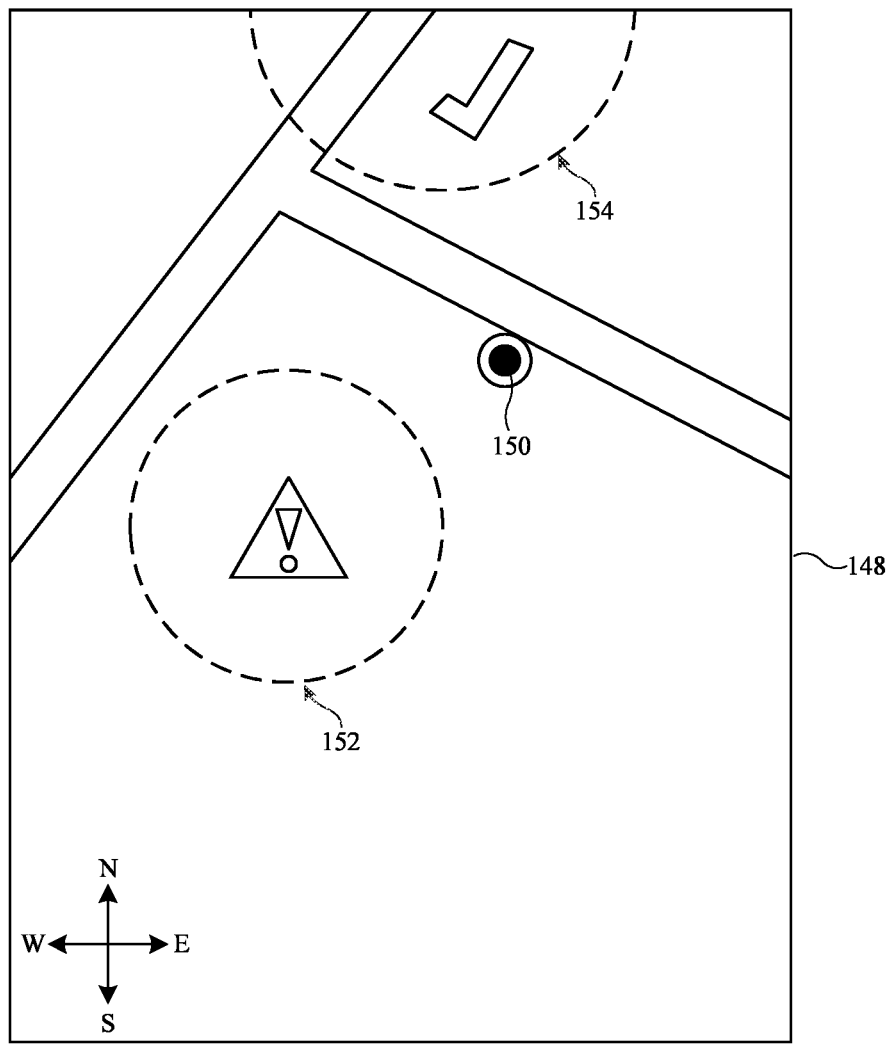
FIG. 9 is a diagram of an illustrative graphical user interface that may be generated by user equipment to identify, to a user, the social distancing conditions of cells adjacent to the user equipment device in accordance with some embodiments.

FIG. 9 shows an example of a graphical user interface that may be displayed on display 24 in response to the information transmitted by network equipment 73 at operation 138 of FIG. 7. As shown in FIG. 9, a graphical user interface (GUI) such as graphical user interface 148 may be displayed on display 24 (e.g., by software such as a navigation or map application running on control circuitry 16 of FIG. 1).

In the example of FIG. 9, graphical user interface 148 displays a map of the geographic area around UE device 12 (e.g., geographic area 48 of FIG. 8). Graphical user interface 148 may display an icon or indicator 150 at the location of UE device 12 (e.g., at location 145 of FIG. 8). Graphical user interface 148 may display a graphical indicator 152 overlapping some or all of cell 142 (FIG. 8) that identifies to the user of UE device 12 that this geographic area is non-social distancing-friendly. Additionally or alternatively, graphical user interface 148 may display a graphical indicator 154 overlapping some or all of cell 140 (FIG. 8) that identifies to the user of UE device 12 that this geographic area is social distancing-friendly. The user of UE device 12 may use this information to proactively avoid the area overlapping cell 142, for example. Graphical indicators 152 and 154 may include alerts, flags, warnings, push notifications, icons, banners, shapes, videos, images, texts, pins, circles, animations, and/or any other desired visual indicators. Additionally or alternatively, UE device 12 may issue an audio or haptic alert when the user enters the geographic area of cell 142 to warn the user that the cell is non-social distancing-friendly.

If desired, a cell may be deemed social distancing-friendly under any of the embodiments described above if the connection count for the cell exceeds or is greater than or equal to a threshold value (e.g., a threshold value that is given by the maximum number of individuals u allowed for the cell) and a cell may be deemed non-social distancing-friendly under any of the embodiments described above if the connection count for the cell is less than the threshold value. In other words, network equipment 73 may identify the social distancing conditions of a given cell based at least on the connection count for the cell as a proxy or estimate for the total population of the cell and may, if desired, refine or adjust the estimated total population based on UE sensor data, API data from other network carriers, scheduling information, and/or time/date information (e.g., connection count on its own may serve as the estimate for total population of a cell if desired). If desired, the social distancing guideline as described herein may be set by the user of the UE device (e.g., instead of or in addition to by a regulatory body). The user may, for example, provide a user input to a software application via a user input device that sets the social distancing guideline or threshold distance d (e.g., according to the user's own comfort level), and the UE device or other equipment may inform the network of the user's selection/preference for use in informing the UE device when certain areas are or are not social distancing-friendly.

The methods and operations described above in connection with FIGS. 1-9 may be performed by the components of UE device 12 and/or network equipment 73 using software, firmware, and/or hardware (e.g., dedicated circuitry or hardware). Software code for performing these operations may be stored on non-transitory computer readable storage media (e.g., tangible computer readable storage media) stored on one or more of the components of UE device 12 and/or network equipment 73. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of UE device 12 and/or network equipment 73. The processing circuitry may include microprocessors, central processing units (CPUs), application-specific integrated circuits with processing circuitry, or other processing circuitry.

As described above, one aspect of the present technology is the gathering and use of data available from various sources to improve the transmission of information to a user of a user equipment device at a given location and/or as the user equipment device moves through a geographic area. While a UE device 10 may gather and/or use personally identifiable information, the methods described herein limit or prevent exposure of this information to the network itself and to other users. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. A method of operating a wireless network having a set of base stations, the method comprising:
   identifying a connection count indicative of a number of user equipment (UE) devices connected to a base station from the set of base stations;
   estimating a population of a cell of the base station based at least on the connection count;
   estimating an area required by an individual in the cell based on a social distancing guideline;
   identifying, based on the estimated area, a maximum number of individuals allowed in the cell by the social distancing guideline; and
   providing, when the estimated population exceeds the maximum number of individuals allowed in the cell, information to a UE device for display by the UE device.

2. The method of claim 1, wherein identifying the connection count comprises:
   harvesting anonymized UE data from UE devices connected to the set of base stations; and
   identifying the connection count based on the anonymized UE data.

3. The method of claim 2, wherein the anonymized UE data comprises time stamp values and globally unique cell identifiers.

4. The method of claim 3, wherein the anonymized UE data is devoid of information that identifies the UE devices.

5. The method of claim 1, wherein the information comprises a message indicative of the estimated population exceeding the maximum number of individuals.

6. The method of claim 1, wherein the social distancing guideline comprises a distance between two persons.

7. The method of claim 1, further comprising:
   receiving, at a user input device, an input that identifies the social distancing guideline.

8. The method of claim 1, wherein the social distancing guideline is issued by a governing body associated with land that includes the cell.

9. The method of claim 1, wherein estimating the population further comprises estimating the population based on a wireless communications schedule associated with the base station.

10. The method of claim 1, further comprising:
    receiving a query from the UE device, wherein the query identifies a geographic area that includes the cell of the base station, the UE device being at a location outside of the cell of the base station.

11. The method of claim 10, wherein estimating the population further comprises estimating the population based on a wireless communications schedule associated with the base station.

12. The method of claim 11, wherein the wireless communications schedule comprises information identifying a data allocation between the UE devices connected to the base station.

13. The method of claim 10, wherein the base station is associated with a first network carrier, the method further comprising:
    receiving application programming interface (API) information from a second network carrier different from the first network carrier, wherein the API information identifies additional UE devices of the second network carrier located within the cell; and
    estimating the population based on the API information.

14. The method of claim 13, wherein estimating the population further comprises:
    estimating the population density based on a communications schedule of the first network carrier.

15. The method of claim 14, wherein estimating the population further comprises:
    increasing or decreasing the estimated population density based on a current date and time.

16. The method of claim 10, wherein providing the information to the UE device comprises providing, responsive to receipt of the query, the information to the UE device via an additional base station of the set of base stations, the additional base station having an additional cell that includes the location.

17. A wireless network comprising:
    a set of base stations; and
    one or more processors configured to
       identify a connection count indicative of a number of user equipment (UE) devices connected to a base station from the set of base stations, the base station being associated with a first network carrier,
       receive application programming interface (API) information from a second network carrier different than the first network carrier, wherein the API information identifies one or more additional UE devices of the second network carrier located in a cell of the base station,
       estimate a population density of the cell based at least on the connection count and the API information, and provide information indicative of the estimated population density to a UE device for display by the UE device.

18. The wireless network of claim 17, the one or more processors being further configured to provide the information to the UE device responsive to receipt of a query from the UE device, wherein the query identifies a geographic area that includes the cell of the base station and the UE device is at a location outside the cell of the base station.

19. A non-transitory computer-readable storage medium storing one or more programs configured to be executed by at least one processor of a wireless network, the one or more programs including instructions that, when executed by the at least one processor, cause the at least one processor to:
- harvest anonymized user equipment (UE) data from UE devices connected to a set of base stations of the wireless network, the anonymized UE data being devoid of information that identifies the UE devices,
- identify, based on the anonymized UE data, a connection count indicative of a number of the UE devices that are connected to a base station from the set of base stations,
- estimate a population density of a cell of the base station based at least on the connection count, and
- provide information indicative of the estimated population density to a UE device for display by the UE device.

20. The non-transitory computer-readable storage medium of claim 19, wherein the information is provided to the UE device responsive to receipt of a query from the UE device, the query identifies a geographic area that includes the cell of the base station, the UE device is at a location outside the cell of the base station.

\* \* \* \* \*

UNITED STATES PATENT AND TRADEMARK OFFICE
CERTIFICATE OF CORRECTION

| | | |
|---|---|---|
| PATENT NO. | : 12,156,092 B2 | Page 1 of 1 |
| APPLICATION NO. | : 17/592343 | |
| DATED | : November 26, 2024 | |
| INVENTOR(S) | : Mahak Goindani and Gencer Cili | |

It is certified that error appears in the above-identified patent and that said Letters Patent is hereby corrected as shown below:

In the Claims

Column 22, Line 40, "population density" should read -- population --

Column 22, Line 44, "population density" should read -- population --

Signed and Sealed this
Seventh Day of January, 2025

Derrick Brent
*Acting Director of the United States Patent and Trademark Office*